United States Patent Office 3,736,288
Patented May 29, 1973

3,736,288
DRAG REDUCING FORMULATIONS
Julius J. Stratta, New City, Carl W. Frank, White Plains, and John A. Barrere, Jr., Valley Cottage, N.Y., assignors to Union Carbide Corporation, New York, N.Y.
No Drawing. Continuation-in-part of application Ser. No. 118,442, Feb. 24, 1971. This application July 9, 1971, Ser. No. 161,280
Int. Cl. C08g 51/34
U.S. Cl. 260—33.4 R          10 Claims

ABSTRACT OF THE DISCLOSURE

This invention relates to improved hydrodynamic drag reducing formulations which comprise (a) particulate ethylene oxide polymer, (b) an inert, normally-liquid, water-miscible organic vehicle which is a non-solvent for said ethylene oxide polymer such as propylene glycol, (c) a suspending agent which is non-reactive with said ethylene oxide polymer and said organic vehicle such as colloidal silica, and (d) a surface active agent. The use of the surface active agent results in systems which are characterized by their improved handling characteristics such as fluidity, pumpability, and/or pourability. Though the viscosity of the system is significantly decreased, the hydrodynamic drag deduction efficiency characteristic remains practically uneffected. Moreover, at such decreased viscosity levels one can now increase, to a significant extent, the concentration of ethylene oxide polymer in the system and still maintain a viscosity level which is no greater than comparable systems formulated without a surface active agent.

---

This application is a continuation-in-part of copending application Ser. No. 118,442 entitled Drag Reducing Systems Comprising Ethylene Oxide Polymers by J. J. Stratta, et al., filed Feb. 24, 1971.

This invention relates to improved drag reduction formulations or systems which are effective for reducing the dynamic drag of turbulent fluid in contact with a surface. In one aspect, the invention relates to novel hydrodynamic drag reduction formulations which are characterized by improved handling characteristics, e.g., fluidity, pumpability, and/or pourability, at relatively high concentrations of the hydrodynamic drag reducing agent.

The term "drag reduction," as it is known in the art, is the increase in the volumetric flow rate of a fluid at a constant pressure drop due to the addition, usually of a small amount, e.g., a couple of hundred p.p.m. or less, of a solid linear, polymeric material of relatively high molecular weight. Such material is known as the "drag reducing agent." Throughout this specification the drag reducing agent will also be referred to as the "active polymer."

The term "hydrodynamic drag reducing efficiency" (hereinafter oftentimes referred to as "efficiency") is measured as the percent increase in the flow of treated tap water (contains the hydrodynamic drag reducing agent) relative to the flow rate of untreated tap water (lacks the hydrodynamic drag reducing agent).

In recent years, considerable interest has been shown in the phenomenon of drag reduction in water under turbulent flow conditions caused by the addition of certain water soluble polymers. One approach utilized concentrated aqueous solutions of drag reducing polymers as stock solutions. In general, such polymers were of rather high molecular weights and, when dissolved at concentrations in excess of one weight percent, formed extremely viscous, almost gelatinous aqueous solutions. By way of illustration, extremely viscous aqueous solutions containing from about 1.0 to about 2 weight percent of poly-(ethylene oxide) which has an average molecular weight of approximately 4,000,000 can be proportioned into a flowing stream of water at such a rate to achieve an effective dosage of about 50 p.p.m. Though such drag reducing aqueous solutions offer proportionation convenience, they also present serious disadvantages. Such disadvantages include low concentrations of active polymer, i.e., poly-(ethylene oxide), because of viscosity limitations; large storage capacity in light of the minimal amount of active polymer dissolved therein; susceptibility of the active polymer to undergo mechanical shear during proportionation thereby resulting in a loss of hydrodynamic drag reducing efficiency; and susceptibility of the active polymer to oxidative degradation which also lead to less hydrodynamic drag reducing efficiencies.

In view of the disadvantages inherent in the aqueous solution technique, the so-called "slurry" or "dispersion" approach was very recently developed. This approach has met with varying degrees of success. It involves suspending, at least temporarily, the polymeric drag reducing agent in an organic vehicle in order to obtain a formulation having a more concentrated form of the drag reducing agent. The slurry or dispersion approach offered systems in which mechanical shear susceptibility as well as oxidative degradation of the polymeric drag reducing agent was lessened.

Accordingly, one or more of the following objects will be achieved by the practice of the invention.

One object of the invention is to provide novel drag reducing systems or formulations which comprise particulate water-soluble, high molecular weight ethylene oxide polymer as the drag reducing agent; an inert, normally-liquid, water-miscible organic vehicle in which said ethylene oxide polymer is insoluble therein; a suspending or thickening agent; and a surface active agent. Another object is to provide novel hydrodynamic drag reducing systems that allow for changes in rheologies or flow properties in order to improve handling characteristics such as pumpability, pourability, and/or stratification resistance without suffering concurrent changes in hydrodynamic drag reducing efficiency, that is, in their ability to reduce the hydrodynamic drag of water undergoing turbulent flow. A further object of the invention is to provide novel drag reducing systems which exhibit a high degree of fluidity notwithstanding the fact that such systems contain relatively high concentrations of drag reducing agent dispersed therein. These and other objects will become apparent to those skilled in the art from a consideration of this specification.

Broadly, the invention is directed to novel drag reducing systems or formulations which comprise:

(a) Particulate water-soluble ethylene oxide polymer which has an average molecular weight greater than about 500,000 as the drag reducing agent therefor;

(b) An inert, normally-liquid, water-miscible organic vehicle which is a non-solvent for said ethylene oxide polymer, said organic vehicle being composed of carbon, hydrogen, and oxygen atoms, said oxygen atoms being in the form of alcoholic hydroxylic oxygen (—OH) and/or aliphatic etheric oxygen (—O—);

(c) A suspending agent which is non-reactive with said ethylene oxide polymer and said organic vehicle, said suspending agent being employed in an amount at least sufficient to retard stratification of the systems for extended periods of time; and (d) A surface active agent or surfactant which is compatible with said organic vehicle and which is comprised of a hydrophobic moiety and a hydrophilic moiety.

Illustrative of the ethylene oxide polymers, oftentimes referred to herein as the "active polymer" or "drag reducing agent," which are contemplated in the novel systems include homopolymers of ethylene oxide and copolymers of ethylene oxide with one or more polymerizable olefin monoxide comonomers. Since the ethylene oxide polymers must be water-soluble a realistic limitation is thus placed on the amount of olefin oxide monomer that can be contained in such polymers. The olefin oxide comonomers have a sole vicinalepoxy group, i.e.,

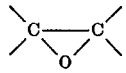

group, and they are illustrated by 1,2-propylene oxide, 2,3-butylene oxide, 1,2-butylene oxide, styrene oxide, 2,3-epoxyhexane, 1,2 - epoxyoctane, butadiene monoxide, cyclohexene monoxide, epichlorohydrin, and the like. Desirable water-soluble ethylene oxide polymers include poly(ethylene oxide) and copolymers of ethylene oxide with minor amounts of propylene oxide, butylene oxide, and/or styrene oxide, for example, copolymers which contain upwards to about 15 weight percent of the olefin oxide comonomer. It should be noted that the term "copolymer" is used in its generic sense, that is, a polymer formed via the polymerization of two or more polymerizable monomers. Poly(ethylene oxide) and copolymers of ethylene oxide with propylene oxide are preferred. From standpoints of price, commercial availability, performance and effectiveness as hydrodynamic drag reducing agent, poly(ethylene oxide) is the active polymer of choice. The preparation of the ethylene oxide polymers is well documented in the literature, e.g., U.S. Pat. Nos. 2,969,403; 3,037,943; and 3,167,519.

The particulate ethylene oxide polymer has an average molecular weight greater than about 50,000, and desirably from about 1,000,000 to about 12,000,000. Depending upon a correlation of factors such as the type and concentration of active polymer, the nature of the organic vehicle and suspending agent, etc., maximum hydrodynamic reducing efficiency can be obtained by employing active polymers which have an average molecular weight range of from about 2,000,000 to about 10,000,000. Desirably, the particulate ethylene oxide polymer has a particle size distribution of which at least about 85 weight percent passes through a 20 mesh screen. Preferably, the particle size distribution of the ethylene oxide polymer is such that at least 85 weight percent passes through a 20 mesh screen and at least 10 weight percent passes through a 60 mesh screen. Extremely effective results have been obtained by using active polymer of which at least about 95 weight percent and upwards from about 98 weight percent, pass through a 20 mesh screen and at least 45 weight percent pass through an 80 mesh screen.

The invention also embraces novel formulations which exhibit a "staggered dissolving" or "controlled dissolving" characteristic by virtue of the active polymer being comprised of or formed from blends of varying molecular weight fractions and/or particle sizes. This characteristic is useful in applications which requires a substantially constant level of performance efficiency over an extended period of time such as, for example, in reducing the hydrodynamic drag of turbulent water in a conduit. Those active polymer species of relatively lower molecular weight and/or finer particle size dissolve more quickly in the turbulent water and provide a relatively high level of drag reduction efficiency over the first sections of the conduit. However, once fully dissolved and performing as a hydrodynamic drag reducing agent, these dissolved species of active polymer can undergo mechanical shear degradation thereby becoming less efficient downstream. Such loss in efficiency is compensated for by the dissolving of fresh active polymer from the slower dissolving paticles that are more coarse, i.e., of lesser surface area, and/or are of relatively higher molecular weight. By utilizing a source of active polymer which has a spectrum of particles sizes and/or molecular weights, as indicated previously, a continuous supply of freshly dissolved polymer can be provided throughout the length of the conduit. The hydrophilicity characteristic of the active polymer can be altered by varying the amount of olefin oxide comonomer polymerized therein. Blends of active polymer which have different degrees of water solubility due to their chemical structure can also be used to obtain this "staggered dissolving" effect.

The concentration of active polymer contained in the novel system can be varied over a wide range. Factors such as available storage capacity and intended application are practical considerations which influence the active polymer concentration. The minimum limit can be as low as one weight percent and lower, based on the weight of the novel formulation. At such concentrations, though the advantages of mechanical shear stability and resistance toward oxidative degradation of the active polymer are retained, the dilute character of the systems necessitates the use of large storage capacities so as to limit the applicability of such systems to a very narrow range. On the other hand, as loading of active polymer in the novel system approaches 70 weight percent, and higher, the compromise between the conflicting requirements of stratification resistance versus convenient pumpability becomes more difficult to achieve. Furthermore, the expense and sophistication of the necessary pumping and metering equipment becomes prohibitive. Consequently, novel formulations or systems which contain about 5 to about 65 weight percent, and higher, of active polymer are useful over a broad spectrum of applications, though concentrations outside of this range have utility and are within the scope of the broad invention. The optimum concentration of active polymer in the novel system is, therefore, that which offers the best compromise between the conflicting characteristics of high loading and excellent stratification stability on the one hand, and good pumpability and rapid dissolution rates on the other hand. In applications in which it is desirable to reduce the turbulence of a fluid in contact with a surface, e.g., the transport of water through a conduit or the propulsion or towing of a vessel, the preferred concentration of active polymer in the novel system is in the range of about 15 to about 55 weight.

It has also been generally observed that as the particle size distribution of the active polymer becomes finer, the bulk density of the active polymer increases. By way of illustrations, poly(ethylene oxide) of approximately 2,500,000 average molecular weight of which at least about 98 weight percent of the particle sizes are finer than 20 mesh (0.841 mm.) and of which about 45 weight percent are finer than 100 mesh (0.149 mm.) has a bulk density of about 20 pounds per cubic foot. Thus, novel systems containing about 25 weight percent poly(ethylene oxide) having the aforesaid particle size distribution can be conveniently prepared. Novel systems containing as much as 40 weight percent active polymer can be prepared with poly(ethylene oxide) which is characterized by a particle size distribution of which at least about 98 weight percent will pass through a 20 mesh screen, of which at least 60 weight percent will pass through a 100 mesh screen (0.149 mm.), and an appreciable fraction (about 10 to about 20 weight percent) of which will pass through a 200 mesh screen (0.074 mm.). Finer particle size distributions and higher bulk densities lead to loadings in excess of 40 weight percent active polymer concentration in novel systems. As indicated previously, the desired concentration of active polymer in the novel system will be largely influenced by the application intended, by the particle size of the active polymer, and by a correlation and optimization of the characteristics discussed above, e.g., pumpability, pourability, stratification resistance, and the like.

The organic vehicles which are applicable in the practice of the invention are inert, normally-liquid, water-miscible organic compounds which are a non-solvent for the active polymer. These organic compounds are composed of carbon, hydrogen, and oxygen atoms, said oxygen atoms being in the form of alcoholic hydroxylic oxygen (—OH) and/or aliphatic etheric oxygen (—O—). By the terms "alcoholic hydroxylic oxygen," as used herein, is meant oxygen in the form of a hydroxyl group which group is monovalently bonded to an aliphatic or cycloaliphatic carbon atom.

Desirable organic vehicles which can be employed in the practice of the invention are best illustrated by the alkenediols as exemplified by propylene glycol, 1,3-butylene glycol, 1,4-butylene glycol, 1,6-hexylene glycol, ethylene glycol, 2-methylpentane-2,4-diol, octane-1,2-diol, and the like. Mixtures of alkanediols with minor amounts of higher functional liquid polyols and end-blocked polyols, e.g., glycerol, can also be employed. Though liquid polypropylene glycols and alkoxy terminated diols may be employed, they are not desirable since formulations prepared from the same suffer from various disadvantages, e.g., relatively low flash point, limited applicable temperature range, and/or accelerated oxidative degradation of the active polymer. The alkanediols which have up to ten carbon atoms are preferred. Propylene glycol is the organic vehicle of choice since its $LD_{50}$ value is 26.3 whereas the $LD_{50}$ value of, for example, polypropylene glycol (of about 400–425 average molecular weight) is about 2.5. Propylene glycol is "generally recognized as safe" (GRAS) for use in foods intended for human consumption and is widely used in cosmetics and in medical ointments for skin applications in accordance with the Food, Drug and Cosmetics Act. Such relatively low toxicity and general acceptance by an important agency of the United States government makes novel systems based on propylene glycol extremely attractive especially in drag reduction applications such as irrigation and fire-fighting which utilize a potable water source without fear of contaminating said potable water source or causing extensive injury or damage to personnel occasioned by spillage, spray, etc., of the propylene glycol-biased system. For the foregoing reasons and in view of the fact that propylene glycol is a commodity chemical, is very inexpensive, and is biodegradable, make novel systems based on propylene glycol highly preferred (especially from pollution, ecological, and health standpoints).

The expression "$LD_{50}$" as used herein represents the lethal nature of a single oral dosage of grams of organic vehicle per kilogram of animal (rat) body weight necessary to kill 50 percent of such animals.

The concentration of the organic vehicle (including the small quantity of the suspending agent) can range from about 35 to about 95 weight percent of the novel system, preferably from about 50 to about 90 weight percent. For instance, a typical formulation used in the operative examples described hereinafter comprised 25 parts by weight of active polymer, from about 50 to 70 parts by weight of organic vehicle, up to about 5 parts by weight of suspending agent, and up to about 1 part by weight of surface active agent.

The organic vehicles of choice give novel systems which unexpectedly exhibit high resistance to stratification and molecular weight degradation of the active polymer, and which allow for changes in rheologies in order to improve their handling characteristics without suffering any appreciable concurrent changes in their markedly high hydrodynamic drag reducing efficiencies. Such novel systems exhibit a favorable balance of handling characteristics. They are quickly dispersible in and rapidly dissolvable in a turbulent stream of aqueous fluid; they are resistant to "caking" or drying out effects, when inadvertently exposed to the atmosphere, for example, during application; and they can be stored in hot geographical areas or warehouses prior to application without fear of ignition or explosion due to the vapors from the organic vehicle.

The third component contained in the novel systems is the suspending agent. The suspending agent is compatible in the system and non-reactive with the organic vehicle, active polymer, or surface active agent. Small amounts (of the suspending agent) should have the ability to greatly thicken the organic vehicle and/or to coat the active polymer thereby preventing stratification of the active polymer over extended periods of time. The suspending agents can be exemplified by high molecular weight organic polymers which are soluble in the organic vehicle; and the organic and inorganic solid materials which are insoluble in the organic vehicle, which are characterized by high surface areas, e.g., about 100 square meters per gram, and which have the ability to form aggregated structures. The latter materials may often be referred to as thixotropic agents. Examples of typical suspending agents include colloidal silica, colloidal silica-alumina mixtures, chrysotile asbestos, colloidal clays such as montmorillonite, modified clays of the magnesium aluminum silicate mineral types, microcrystalline asbestos, microcrystalline nylon, hydroxypropylcellulose, propylene glycol derivatives of alginic acid, polyvinylpyrrolidone, and others readily apparent to those skilled in the art.

The suspending agents are employed in an amount at least sufficient to retard stratification of the novel systems of extended periods of time, such as during storage and in transit. It will be readily appreciated to one skilled in the art that the optimum concentration of suspending agent will be influenced by the intended use of the novel system, the proportionation hardware to be used to meter the system, the pumpability and pourability characteristics which are desired, the weight percent active polymer contained in the system, the nature of the suspending agent, and other factors. It is apparent that no hard and fast rule can be set down to fix numerical limits regarding the concentration of suspending agent to be employed in the novel systems. Taking into consideration the influences described previously, the concentration of the suspending agent can range from about 0.1, and lower, to about 7, and higher weight percent, based on the total weight of the novel system.

The fourth component contained in the novel systems is the surface active agent (or surfactant). The use of such surface active agents results in novel formulations which are characterized by marked improvement in several properties, e.g., homogenity, creaminess, fluidity, pourability, lower viscosity, less susceptibility to compaction during pumping, and/or ease of dispersibility and dissolvability in water. The novel formulations have exceptionally improved fluidity, and they are more easily poured and/or pumped in spite of the fact that the level of active polymer, i.e., drag reducing agent, and suspending agent, is virtually unchanged. Since the viscosity of the novel formulation is considerably reduced, one is able to increase the content of the active polymer when formulating a system to a constant viscosity level. Moreover, the use of the surface active agent results in ease of preparation of the novel formulation. Less sophisticated and less expensive mixing machinery can be employed to prepare such formulations.

As will be observed hereinafter from the operative examples, the pourability of chilled formulations comprising ethylene oxide polymer is greatly improved by small amounts of a surface active agent therein. By way of illustration, a formulation must flow from the storage reservoir into the throat of the proportionation device at a rate of about 10 milliliters/second to meet peak demand in a specific fire-fighting application. Using gravity per se, as the driving force in a simulated test apparatus, this rate is observed at 50° F. for a formulation comprising 25 weight percent active polymer (and no surface active agent). The addition to such formulation of 0.1 weight percent surface active agent, i.e., allows the same flow rate to be maintained at 23° F.

Centrifugation tests and stratification stability evaluation of the novel formulations resulted in the various surprising advantages. Notwithstanding the fact that the surface active agent markedly lowers the viscosity of the system, the stability of such system does not reflect this decreased viscosity. Rather, the stability of the system was actually retained or somewhat improved by using the surface active agent. In those instances in which centrifugation was sufficiently severe to cause a separation and the formation of a sediment, the sediment was usually far less and/or much more easily redispersible when employing a system which contained a surface active agent.

The surface active agents which are contemplated are those which are compatible with the organic vehicle and which are comprised of a hydrophobic moiety and a hydrophilic moiety.

By the term "compatible," as used in the above sense, is meant that the surface active agent does not cause the active polymer to precipitate, nor does it form a complex with the active polymer. Such agents may be cationic, anionic, non-ionic or amphoteric, and they are, in general, characterized by an ability to measurably influence the surface tension of water.

Illustrative of the suitable surface active agents which can be employed include the ethoxylated fatty acids of the formula

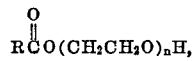

the ethoxylated fatty acid amides of the formula

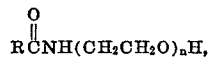

and the alkanolamides of the formulas

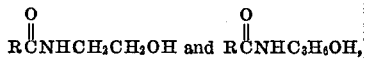

wherein R is desirably a $C_{10}$–$C_{18}$ alkyl group and wherein $n$ is an integer of 1 to 50; the ethylene oxide condensation products of primary amines of the formula

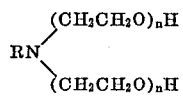

wherein R is desirably a $C_8$–$C_{22}$ alkyl group; the diamines of the formula $RCNHC_3H_6NH$ wherein R is desirably a $C_8$–$C_{22}$ alkyl group; the phosphate esters obtained via the reaction of a phosphorus oxide, e.g., phosphorus pentoxide, with monohydric compounds, e.g., alkanols, ethylated alkanols, etc., or alkylphenols; the imidazolines obtained via the reaction of fatty acids with N-aminoethyl-alkanolamines; the ethylene oxide adducts of alkanols, of alkylphenols, etc., such as those having the formula R-$(OC_2H_4)_nOH$ in which $n$ equals 3 to 50 and R represents $C_8$–$C_{18}$ alkyl or $C_8$–$C_{18}$ alkylphenyl; the sulfated ethylene oxide adducts of alkylphenols; sodium alkylnaphthalenesulfonate; sulfonated monoglyceride of coconut fatty acids; sorbitan "sesquioleates" (mixed mono- and dioleates); polyethylene sorbitol oleate laurate; sorbitan monopalmitate; polyethylene glycol ester of tall oil acids; tris(polyoxyethylene) sorbitan monolaurate and monooleate; polyethylene glycol stearate; and the like.

High desirable surface active agents include the "hydrolyzable" and "non-hydrolyzable" polysiloxane-polyoxyalkylene block polymers (i) wherein at least one polyoxyalkylene block is joined to at least one polysiloxane block through a Si—O—C bond or a Si—C bond, (ii) wherein the oxyalkylene moieties of the polyoxyalkylene block contain from 2 to 4 carbon atoms, (iii) wherein the siloxane moieties of the polysiloxane block are disubstituted by monovalent hydrocarbon radicals, (iv) wherein the block polymer is comprised of from about 10 to about 80 weight percent polysiloxane and from about 90 to about 20 weight percent polyoxyalkylene, and (v) wherein the average molecular weight of the block polymer is from about 650 to about 25,000, preferably from about 800 to about 15,000.

With reference to exemplary "hydrolyzable" polysiloxane-polyoxyalkylene block polymers which can be employed as surfactants, the siloxane linear polymer or chain of recurring siloxane units can be represented by the following formula:

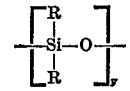

wherein each R is a hydrocarbyl group and wherein $y$ is an integer of at least 2. By the term "hydrocarbyl" group, as used herein, is meant a monovalent group composed of carbon and hydrogen of which the aliphatic and aromatic groups are illustrative. Representative aliphatic groups include methyl, ethyl, propyl, isopropyl, the butyls, the hexyls, 2-ethylhexyl, isooctyl, vinyl, and the like. Representative of the aromatic groups are illustrated by aryl, alkaryl, and aralkyl radicals such as phenyl, benzyl, tolyl, phenethyl, methylphenyl, and the like. Thus, a silicone block of two units in which the hydrocarbyl groups are methyl, i.e.,

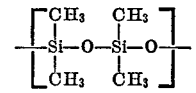

has a molecular weight of 148 which represents the lower limit attributable to the polysiloxane block. The upper molecular weight limit of the polysiloxane block can be 25,000, and higher. In general, hydrolyzable polysiloxane-polyoxyalkylene block polymers in which a molecular weight of from about 500 to about 10,000 is attributable to the polysiloxane portion are desirable in the practice of the invention.

The linear polyoxyalkylene segment of such block polymers is comprised for the most part of recurring oxyalkylene groups which can be represented by the formula $(C_nH_{2n}O)_x$ in which $n$ is an integer from 2 to 4 and $x$ is an integer which is at least 5. Thus, a polyoxyalkylene block of five units in which $n$ is 2 has a molecular weight of 220 which is the minimum molecular weight attributable to this block. Polyoxyalkylene blocks having molecular weights up to about 10,000 represents a desirable upper limit.

For further discussion concerning the preparation of surfactants which are contemplated in the practice of the invention, reference is made to U.S. Pat. Nos. 2,834,748; 2,917,480; and 3,246,048.

The surfactant can be present in amounts ranging upwards to about 5 weight percent, based on the total weight of the formulation. Those skilled in the art can easily determine the concentration of surfactant which is necessary for optimum results. Factors which will influence, to a degree, such concentration include the surfactant of choice, the organic vehicle of choice, and the concentration and choice of the active polymer and suspending agent. The preferred concentration range is from about 0.01 to about 2 weight percent surfactant, based on the total weight of the formulation.

The novel formulations may contain ingredients other than the polymeric drag reducing agent, organic vehicle, suspending agent, and surface active agent. Such additional ingredients can be called upon to perform any one of a multiplicity of functions depending upon the intended handling technique or end use.

Additional components that can be contained in the novel formulations include stabilizers which are capable of arresting degradation or depolymerization of the polymeric drag reducing agent during storage. Such stabilizers may include ultraviolet screening agent, e.g., the benzotriazoles, the phenyl salicylates, etc.; antioxidants such as the phenothiazines, 2-hydroxypropylethylenediamine, thiourea, 2 - mercaptomethyl-imidazole, phenyl-alpha-naphthylamine, 2,6-di-t-butyl-4-methylphenol, etc.

If desired, dyes can be incorporated into the novel formulations. This expediency offers a convenient mechanism for visually following the amount of drag reducing agent that has been proportioned, for example, into the conduit. In many instances, the use of dyes will indicate the rate of dissolution of the polymeric drag reducing agent in the aqueous medium and oftentimes illustrate changes in flow patterns and suppressed turbulence arising from such use. Examples of suitable dyes include Rhodamine B, Alphazurine FGND, fluorescein, vegetable dyes, etc. Any one of many dyes can be employed provided that it is compatible with the other components of the novel formulation. Other ingredients which can be incorporated into the novel system are corrosion inhibitors designed to protect the metal storage container and to keep the proportionation hardware, lines, metering devices and ejection ports free from rust and corrosion. Such inhibitors depend, to a large degree, upon the type of metal to be protected. Examples include the phosphate and the borate buffered systems.

In the illustrative examples set out hereinafter, various formulations were prepared. These formulations were subsequently evaluated with regard to their physical characteristics and their hydrodynamic drag reducing efficiencies. The methods employed to evaluate such formulations are disclosed. In addition, certain abbreviations and terms are defined.

In the operative examples infra, each formulation comprised (i) particulate high molecular weight poly(ethylene oxide) as the hydrodynamic drag reducing agent per se, (ii) an inert, normally-liquid organic compound as the organic vehicle, (iii) a suspending agent or thickening agent such as fumed colloidal silica, and (iv) a surface active agent (except for the control). These formulations were prepared using a so-called two-step mixing technique. In the first step, the organic vehicle and the surface active agent were introduced into a stainless steel vessel maintained under agitation. Shortly thereafter, the suspending agent was slowly added to the resulting admixture under agitation until a homogeneous dispersion was observed. In general, agitation was continued for periods of time ranging up to about 15 minutes, e.g., about 5 minutes. In the second step, the hydrodynamic drag reducing agent was added to the resulting thickened organic vehicle under agitation until a homogeneous dispersion was obtained. This step required up to about 30 minutes, e.g., about 10 minutes, and was influenced, to a degree, upon the concentration of the hydrodynamic drag reducing agent in the resulting formulation.

The "centrifugation test" was devised in order to expose the particulate poly(ethylene oxide) containing formulations to experimental conditions judged to be most detrimental to stability and to gain an appreciation for relative rates of organic vehicle separation when extrapolated to extended ages. In general, the stability of the formulation was measured in terms of the quantitative proportion of the resultant supernatant organic vehicle exhibited by each formulation after the test under strictly controlled and identical conditions.

The experimental procedure for the centrifugation test was as follows. A weighed quantity (200 grams) of slurry was transferred to one-half pint centrifuge bottles. The bottles were then stoppered and placed (four at a time) in the sample compartment of an International Model U Centrifuge. All samples were centrifuged at 200 r.p.m. (810 R.C.F) for a total of 30 minutes. At the end of 30 minutes, the centrifugation was stopped and the supernatant organic vehicle was measured and the results recorded.

The viscosity values of the formulations or systems are reported in centipoises. These values were determined at 25° C. at a constant rate of shear of 1.59 reciprocal seconds. The apparatus employed was a Haake Rotovisco Rotational Viscometer outfitted with the standard MV–III couette or bob and cup assembly operating at the lowest r.p.m. setting of U equals 162. Such a setting corresponds to 3.6 r.p.m. The MV–III couette system consists of a stationary cup having a diameter of 42 millimeters and a rotating bob having a diameter of 30.4 millimeters and a height of 60.0 millimeters. The viscosity values reported correspond to the lowest value that can be obtained after the system has had essentially all of its thixotropic structure destroyed by exposing the slurry system to a higher shear rate of 259 sec.$^{-1}$ (in which U equals one).

The term "hydrodynamic drag reducing efficiency" (hereinafter oftentimes referred to as "efficiency") is measured as the percent increase in the flow of treated tap water (contains the hydrodynamic drag reducing agent, that is, the active polymer) relative to the flow rate of untreated tap water (lacks the hydrodynamic drag reducing agent). The flow rate of the untreated tap water at 30°±1° C. (expressed as $F_o$ in the expression below) is set at 10 gallons per minute by maintaining a constant pressure drop of 23.75 p.s.i.g. over the test section of the Turbulent Flow Viscometer. When the hydrodynamic drag reducing agent is injected into the flow of water at 30°±1° C., one observes an increase in flow rate when it is measured at a constant pressure of 23.75 p.s.i.g. over the test section of the Turbulent Flow Viscometer. This latter condition represents the flow rate of treated tap water at 30°±1° C. and is expressed as $F_t$. The "hydrodynamic drag reducing efficiency" can therefore be calculated from the following:

$$\frac{F_t - F_o}{F_o} = \text{Efficiency (\%)}$$

The "Turbulent Flow Viscometer" consists primarily of a feedwater holding tank and temperature control, a variable speed pump for injection of controlled amounts of the dispersed system of formulation. A turbine flow meter is used to measure flow rates. Pressure losses are measured with pressure gauges and a differential manometer. The test section of tubing over which pressure losses are measured consists of nine stretches of 0.686 inch I.D. (internal diameter) copper tubing connected by 180 degree return bends to give an effective length of about 132 feet. At a pump discharge pressure of 31 p.s.i.g., water flows at a rate of 10 gallons per minute. When the flow rate of water is increased to 15 gallons per minute, the limitation of the laboratory drain system is reached. The Reynolds number range of the apparatus extends from $2 \times 10^4$ to $8 \times 10^4$, that is, well into the turbulent region. Downstream from the pump but just prior to the test section there is located a point in the piping at which the formulation is injected into the flow of water. The formulation is proportioned by a variable speed syringe pump. Introduction of controlled amounts of the formulation into the flowing water and dissolution therein can be seen through a transparent portion of the piping. Dosage of active polymer is expressed in p.p.m. Actual dosage levels are calculated from a knowledge of the composition of the formulation and the formulation pumping rates.

In the operative examples, the novel systems were loaded with about 25 to about 45 weight percent of active polymer by using particulate poly(ethylene oxide) in which at least 98–99 weight percent passed through a 20 mesh screen; from about 50 to about 90 weight percent passed through a 60 mesh screen; and from about 30 to about 75 weight percent passed through a 100 mesh screen.

| Mesh | Micron |
|---|---|
| 20 | 841 |
| 40 | 420 |
| 60 | 250 |
| 80 | 177 |
| 100 | 149 |
| 200 | 74 |

The term "Surfactant A" represents the non-hydrolyzable polysiloxane-polyoxyalkylene compound having the following formula:

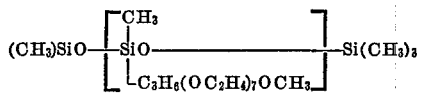

The term "Surfactant B" represents the reaction product of four moles of ethylene oxide with one of n-nonylphenol.

The silica employed as the suspending agent in the examples hereinafter was fumed colloidal silica which possessed a surface area of 325±25 square meters/gram, an average particle size of 0.007 micron, and a density of 2.3 pounds/cubit feet (maximum).

The term "p.p.m." as used herein represents parts of active polymer, e.g., poly(ethylene oxide), per million parts of water.

The term "parts" as used herein signifies parts of weight unless a different meaning is indicated.

EXAMPLES 1-5

(A) Five dispersed formulations were prepared in the manner noted in the discussion prior to the examples. These systems comprised (i) particulate poly(ethylene oxide) having an average molecular weight of approximately 2,500,000 as the hydrodynamic drag reducing agent, (ii) colloidal silica as the suspending agent, (iii) propylene glycol as the organic vehicle, and (iv) if used, Surfactant A or Surfactant B. The viscosity values of these systems were then determined in the manner indicated previously. The pertinent data are noted in Table I below.

(B) The hydrodynamic drag reducing efficiency values of the formulations of Examples 1-3 were determined with the previously described Turbulent Flow Viscometer. These efficiency values shown in Table II below have been interpolated to a constant active polymer concentration of 80 parts per million (p.p.m.) from three separate concentration levels, that is, 25±2, 47±2, and 85±2 p.p.m. of active polymer. It will be observed from a consideration of the data in Table II below that though the addition of a surfactant to the formulations markedly decreased the viscosity of such formulations (and thus gave improved fluidity to the same), the efficiency values were essentially uneffected.

EXAMPLE 6-8

The formulations of Examples 1-3 were subjected to the centrifugation test noted in the procedure preceding the operative examples. This centrifugation test is an indication of the relative rates at which the novel formulations will stratify under gravity during prolonged storage.

It will be noted from the data presented in Table III below that the addition of the surfactant to the dispersed formulations imparted improved fluidity thereto (as evidenced by a noticeable decrease in viscosity). Moreover, it was found that the stability of those formulations containing a surfactant was, unexpectedly, either maintained constant or even enhanced. This is apparent from the weight percent supernatant organic liquid which results after the formulations have been subjected to the centrifugation procedure. The pertinent data are found in Table III below.

TABLE III

| Example number | Formulation | Surfactant, parts | Viscosity, cps. | Supernatant liquid, wt. percent [4] |
|---|---|---|---|---|
| 6 | (1) | None | 35,000 | 26 |
| 7 | (2) | 0.05 | 28,300 | 25.5 |
| 8 | (3) | 0.50 | 25,000 | 22 |

[1] Formulation described in Example 1 supra.
[2] Formulation described in Example 2 supra.
[3] Formulation described in Example 3 supra.
[4] Weight percent supernatant liquid (after centrifugation test), based on total weight of formulation.

EXAMPLES 9-10

Two dispersed formulations were prepared in the manner noted in the discussion prior to the examples with the exceptions that 500 pound batches were prepared and the mixing cycle in the second step was maintained for periods of about 90 minutes. The data are shown in Table IV below.

TABLE IV

| Example number | Polymer | Parts | Organic vehicle | Parts | Suspending agent | Parts | Surfactant | Parts | Viscosity, cps. |
|---|---|---|---|---|---|---|---|---|---|
| 9 | Poly (EO)[1] | 25 | Propylene glycol | 71.5 | Colloidal silica | 3.5 | None | | 15,800 |
| 10 | do | 25 | do | 71.4 | do | 3.5 | Surfactant A | 0.1 | 8,725 |

[1] Poly (EO) represents poly(ethylene oxide) having an average molecular weight of approximately 2,500,000.

EXAMPLE 11

The flowability of the dispersed formulations of Examples 9-10 was determined at various low temperature levels. The flow rate apparatus comprised an 18 inch length of jacketed copper tubing, 2½ inches in diameter, and held rigid in a vertical position. At the bottom end of the copper tubing was an exit port, 6 inches in length, ¾ inch in diameter, and a ½ inch manually operated gate valve. The other end of the copper tubing was connected to an appropriate pressure source. Cooling of the apparatus was provided by methyl alcohol from a large bath assembly through the jacket completely enclosing the copper tube. At various temperatures, the gate valve was opened for precisely the known time intervals and the weight of formulation passing through said gate valve was accurately determined. Runs were conducted at −20° C., −10° C., 0° C., +10° C., and +20° C. intervals. The formulation thus delivered through the gate valve was collected in a container and weighed. Experiments were per-

TABLE I

| Example number | Polymer | Parts | Organic vehicle | Parts | Suspending agent | Parts | Surfactant | Parts | Viscosity, cps. |
|---|---|---|---|---|---|---|---|---|---|
| 1 | Poly (EO)[5] | 25.00 | Propylene glycol | 72.00 | Colloidal silica | 3.00 | None | | 35,000 |
| 2 | do | 25.00 | do | 71.95 | do | 3.00 | Surfactant A | 0.05 | 28,300 |
| 3 | do | 25.00 | do | 71.50 | do | 3.00 | do | 0.50 | 25,000 |
| 4 | do | 25.00 | do | 71.50 | do | 3.50 | None | | 38,300 |
| 5 | do | 25.00 | do | 70.50 | do | 3.50 | Surfactant B | 1.00 | 21,650 |

[5] Poly (EO) represents poly(ethylene oxide) having an average molecular weight of approximately 2,500,000.

TABLE II

| Formulation | Viscosity, cps. | P.p.m.[4] | Efficiency [5] |
|---|---|---|---|
| (1) | 35,000 | 80 | 48.8 |
| (2) | 28,300 | 80 | 48.3 |
| (3) | 25,000 | 80 | 48.3 |

[1] Formulation described in Example 1; no surfactant.
[2] Formulation described in Example 2; 0.05 part of Surfactant A employed.
[3] Formulation described in Example 3; 0.50 part of Surfactant A employed.
[4] P.p.m. represents parts of active polymer, i.e., poly(ethylene oxide) per one million parts of water.
[5] Efficiency represents the hydrodynamic drag reducing efficiency (percent).

formed under gravity and also at a 10 p.s.i.g. driving force. The pertinent data are shown in Table V below.

TABLE V

| Driving force | Temperature, °C. | Flow rate [1] (grams/second) | Flow rate [2] (grams/second) |
|---|---|---|---|
| Gravity | −20 | 0.70 | 2.78 |
| | −10 | 2.06 | 6.80 |
| | 0 | 4.57 | 14.6 |
| | +10 | 10.1 | 26.2 |
| | +20 | 20.9 | 55.0 |
| 10 p.s.i.g | −20 | 17.6 | 42.2 |
| | −10 | 39.9 | 90.7 |
| | 0 | 97.7 | 210 |
| | +10 | 218 | |
| | +20 | | |

[1] Formulation described in Example 9 supra which contained no surfactant.
[2] Formulation described in Example 10 surpa which contained 0.10 weight percent Surfactant A.

What is claimed is:

1. A dispersed drag reduction formulation which comprises:
   (a) particulate water-soluble ethylene oxide polymer which has an average molecular weight greater than about 500,000, the concentration of said ethylene oxide polymer being in the range of from about 5 to about 65 weight percent, based on the total weight of said formulation;
   (b) an inert, normally-liquid, water-miscible organic vehicle which is a non-solvent for said ethylene oxide polymer, said organic vehicle being composed of carbond, hydrogen, and oxygen atoms, said oxygen atoms being in the form of (i) alcoholic hydroxylic oxygen or (ii) both alcoholic hydroxylic oxygen and aliphatic ether oxygen;
   (c) a suspending agent which is non-reactive with said ethylene oxide polymer and said organic vehicle, said suspending agent being employed in an amount at least sufficient to retard stratification of the system for an extended period of time; and
   (d) a surface active agent which is compatible with said organic vehicle and which is comprised of a hydrophobic moiety and a hydrophilic moiety.

2. The dispersed formulation of claim 1 wherein said organic vehicle is an alkanediol.

3. The dispersed formulation of claim 2 wherein said organic vehicle is propylene glycol.

4. The dispersed formulation of claim 1 wherein said particulate ethylene oxide polymer possesses an average molecular weight in the range from about 1,000,000 to about 12,000,000 and is of the group consisting of poly(ethylene oxide) and copolymers of ethylene oxide and olefin monoxides.

5. The dispersed formulation of claim 4 wherein said ethylene oxide polymer is of the group consisting of poly(ethylene oxide) and ethylene oxide/propylene oxide copolymers.

6. The dispersed formulation of claim 5 wherein said ethylene oxide polymer is poly(ethylene oxide).

7. The dispersed formulation of claim 1 wherein said surface active agent is employed in an amount ranging upwards to about 5 weight percent, based on the total weight of said formulation.

8. The dispersed formulation of claim 7 wherein said surface active agents are hydrolyzable and non-hydrolyzable polysiloxane-polyoxyalkylene block copolymers.

9. The dispersed formulation of claim 7 wherein said surface active agents are the polyoxyethylated adducts of hydric compounds.

10. The dispersed formulation of claim 1 wherein said organic vehicle is a mixture of alkanediols with minor amounts of glycerol.

References Cited
UNITED STATES PATENTS 3,520,313    7/1970    Seymour _____ 137—13

LEWIS T. JACOBS, Primary Examiner

U.S. Cl. X.R.

137—13; 260—33.2 R